US007907980B2

(12) United States Patent
Cho et al.

(10) Patent No.: US 7,907,980 B2
(45) Date of Patent: Mar. 15, 2011

(54) MAGNETIC LEVITATION SLIDING STRUCTURE

(75) Inventors: Se-hoon Cho, Gwangju-si (KR); Jong-soon Kim, Gimhae-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 833 days.

(21) Appl. No.: 11/891,791

(22) Filed: Aug. 13, 2007

(65) Prior Publication Data

US 2008/0119250 A1 May 22, 2008

(30) Foreign Application Priority Data

Nov. 22, 2006 (KR) .................. 10-2006-0116019

(51) Int. Cl.
*H04W 88/02* (2009.01)
(52) U.S. Cl. .................. 455/575.1; 455/575.4
(58) Field of Classification Search .............. 455/575.1, 455/575.4; 257/66; 355/69, 72; 438/151, 438/164, 774; 427/62; 505/10
See application file for complete search history.

(56) References Cited

U.S. PATENT DOCUMENTS

| | | | |
|---|---|---|---|
| 6,335,542 B2 * | 1/2002 | Miyasaka ............... | 257/66 |
| 6,444,507 B1 * | 9/2002 | Miyasaka ............... | 438/164 |
| 7,252,511 B2 * | 8/2007 | Santos et al. ............ | 439/10 |
| 7,515,930 B2 * | 4/2009 | Eromaki ................. | 455/550.1 |
| 7,539,011 B2 * | 5/2009 | Shih et al. ............... | 361/679.26 |
| 7,577,467 B2 * | 8/2009 | Schechtel et al. ........ | 455/575.4 |
| 7,647,081 B2 * | 1/2010 | Maatta .................... | 455/575.4 |
| 7,692,667 B2 * | 4/2010 | Nguyen et al. .......... | 345/619 |
| 2003/0005851 A1 * | 1/2003 | Post ........................ | 104/281 |
| 2005/0079902 A1 * | 4/2005 | Chen et al. .............. | 455/575.4 |
| 2005/0084121 A1 * | 4/2005 | Muren et al. ............ | 381/171 |
| 2006/0258302 A1 * | 11/2006 | Ding et al. ............... | 455/90.3 |
| 2007/0293284 A1 * | 12/2007 | Chen ........................ | 455/575.1 |
| 2009/0005133 A1 * | 1/2009 | Takahashi ............... | 455/575.3 |

FOREIGN PATENT DOCUMENTS

| | | |
|---|---|---|
| EP | 1 545 099 A1 | 6/2005 |
| KR | 1020050037649 A | 4/2005 |
| KR | 1020050089584 A | 9/2005 |
| WO | WO 2004/112267 A1 | 12/2004 |

OTHER PUBLICATIONS

Kim et al., U.S. Appl. No. 11/888,541, filed Aug. 1, 2007.
Cho et al., U.S. Appl. No. 11/891,985, filed Aug. 14, 2007.
Cho, U.S. Appl. No. 12/009,522, filed Jan. 18, 2008.
Cho et al., U.S. Appl. No. 12/011,407, filed Jan. 25, 2008.

* cited by examiner

*Primary Examiner* — Diane Mizrahi
(74) *Attorney, Agent, or Firm* — Drinker Biddle & Reath LLP

(57) ABSTRACT

A magnetic levitation sliding structure is provided for a portable electronic device. The sliding structure includes a first slider member with a guide portion, a second slider member with a receiving portion that mates with the guide portion, a first magnet coupled with the guide portion and having magnetic poles arranged in a direction perpendicular to a sliding direction, and a spaced-apart pair of second magnets coupled with the receiving portion. The first magnet is configured in a central portion of the guide portion and is disposed between the spaced-apart pair of second magnets for facilitating relative sliding movement of the first and second slider members. A portable electronic device including the magnetic levitation sliding structure is also provided.

20 Claims, 14 Drawing Sheets

MAGNETIC LEVITATION SLIDING STRUCTURE

CROSS-REFERENCE TO RELATED PATENT APPLICATION

This application claims the benefit of Korean Patent Application No. 10-2006-0116019, filed on Nov. 22, 2006, in the Korean Intellectual Property Office, the disclosure of which is incorporated herein in its entirety by reference.

BACKGROUND OF THE INVENTION

1. Field of the Invention

The present invention relates generally to a sliding structure, and more particularly, to a magnetic levitation sliding structure.

2. Description of the Related Art

Recently, sliding structures have been used in mobile electronic devices, such as, for example mobile phones, cameras, or portable multimedia players (PMPs), because of their convenience in use and refined design.

FIG. 1A is a perspective view of a conventional sliding type mobile phone 10. FIG. 1B is a partial see-through side view of the conventional sliding type mobile phone 10 of FIG. 1A.

Referring to FIGS. 1A and 1B, the conventional sliding type mobile phone 10 includes a receiver unit 20 including a display unit 2 formed thereon, and a transmitter unit 30 including a keypad unit 3, such as dialing keys, configured thereon. The conventional sliding type mobile phone 10 includes a conventional sliding structure 40 such that the conventional mobile phone 10 may be used to receive and transmit calls or messages after sliding the receiver unit 20 upwardly relative to the transmitter unit 30 (or vice versa).

Referring to FIG. 1B, the conventional sliding structure 40, which is disclosed in Korean Patent Publication No. 10-2005-0037649, includes a first slider member 41 and a second slider member 42 that slides on or relative to the first slider member 41.

The first slider member 41 includes a first magnetic force generator 43 and the second slider member 42 includes a pair of second magnetic force generators 44a and 44b, so as to aid a sliding operation using a magnetic force.

In the conventional sliding structure 40, a friction between the first slider member 41 and the second slider member 42 makes the sliding mechanism stiff to operate. In particular, when the units 20 and 30 are oriented such that an attraction force acts between the first magnetic force generator 43 and the second magnetic force generators 44a and 44b during the sliding operation, the friction increases, thereby requiring a greater force to handle the conventional sliding structure 40 and making the sliding operation harder.

FIG. 1C is a view illustrating another conventional sliding structure 50. Referring to FIG. 1C, the sliding structure 50, disclosed in Korean Patent Publication No. 10-2005-0089584, includes a first slider member 51 and a second slider member 52 that slides on or relative to the first slider member 51.

The first slider member 51 includes a first magnet 53 having a generally horseshoe shaped, C-shaped or sideways U-shaped cross-section, and the second slider member 52 includes a second magnet 54 that has a shape similar to that of the first magnet 53. The first magnet 53 and the second magnet 54 are alternately arranged (i.e., an arm of one magnet is configured in a channel of the other magnet and vice versa) to facilitate a sliding operation.

In the sliding structure 50, repelling forces operate between the N pole of the first magnet 53 and the N pole of the second magnet 54, and between the S pole of the first magnet 53 and the S pole of the second magnet 54 so that a sliding operation can be performed. Simultaneously, an attraction force also operates between the S pole of the first magnet 53 and the N pole of the second magnet 54. Accordingly, a sliding operation does not proceed smoothly since a greater force is required to push the sliding structure 50 to overcome the attraction between the first magnet 53 and the second magnet 54.

In addition, in the sliding structure 50, since the first magnet 53 and the second magnet 54, which have horseshoe shapes, are alternately arranged, a large space for such arrangement is required, and thus the thickness of the sliding structure 50 is increased. Also, in curved parts on which parts of the first magnetic member 53 and the second magnetic member 54 are not overlapped, since a repelling force between the parts of the first magnetic member 53 and the second magnetic member 54 is reduced, the sliding operation can not be easily performed.

SUMMARY OF THE INVENTION

According to an aspect of the present invention, there is provided a magnetic levitation sliding structure comprising: a first slider member including a guide portion; a second slider member including a receiving portion that has a complementary shape to the guide portion and slidably mates therewith; a first magnet coupled with the guide portion and being configured along a central portion thereof; and a spaced-apart pair of second magnets coupled with the receiving portion, wherein the first magnet is configured between the pair of spaced-apart second magnets to facilitate relative sliding movement of the first and second slider members.

The sliding structure may further comprise auxiliary receiving portions extending from both sides of the first slider member and each receiving a part of the receiving portion. The auxiliary receiving portions may have a generally L-shaped cross-sectional shape such that the guide portions are substantially enclosed.

The sliding structure may further comprise magnetic shields configured on one or more of the guide portion and the receiving portion.

The receiving portion may have a generally J-shaped cross-sectional shape.

The magnetic poles of the first magnet and the second magnets may be arranged in a direction perpendicular to a sliding direction.

The magnetic poles of the second magnets may be arranged in the same order. Furthermore, the magnetic poles of the second magnets may be arranged in an opposite order to the order of the magnetic poles of the first magnet such that the first magnet and the second magnets repel each other.

The sliding structure may further comprise at least one ferromagnetic member coupled with the guide portion and spaced apart from the first magnet in a direction parallel to a sliding direction.

The at least one ferromagnetic member may include two ferromagnetic members such that the first magnet unit may be configured between a pair of ferromagnetic members.

The first magnet and the second magnets may be configured so that an imaginary line, which is perpendicular to the lengths of the second magnets and which connects facing surfaces of the second magnets, can pass through at least a part of the first magnet unit during a sliding operation.

The first magnet and the second magnets may be configured so that a repelling force can act between the first magnet and the second magnets during a substantially entire sliding operation of the sliding structure.

The sliding structure may further comprise magnetic shields disposed on one or more parts of the first magnet and/or the second magnet.

The magnetic shields may comprise a ferromagnetic substance.

DETAILED DESCRIPTION OF THE EMBODIMENTS

The present invention will now be described more fully with reference to the accompanying drawings, in which exemplary embodiments of the invention are shown.

Figure 1A:
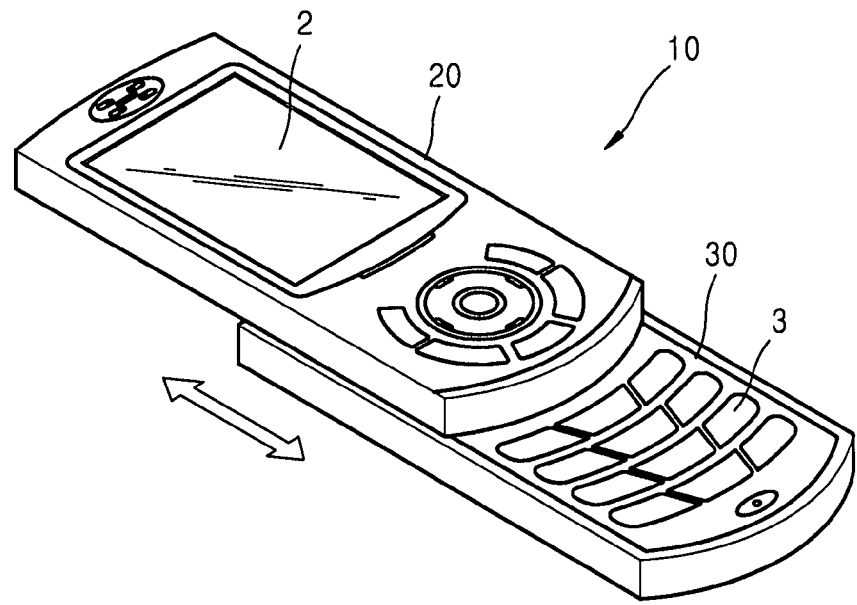
FIG. 1A is a perspective view of a conventional mobile phone having a sliding structure.
Figure 1B:
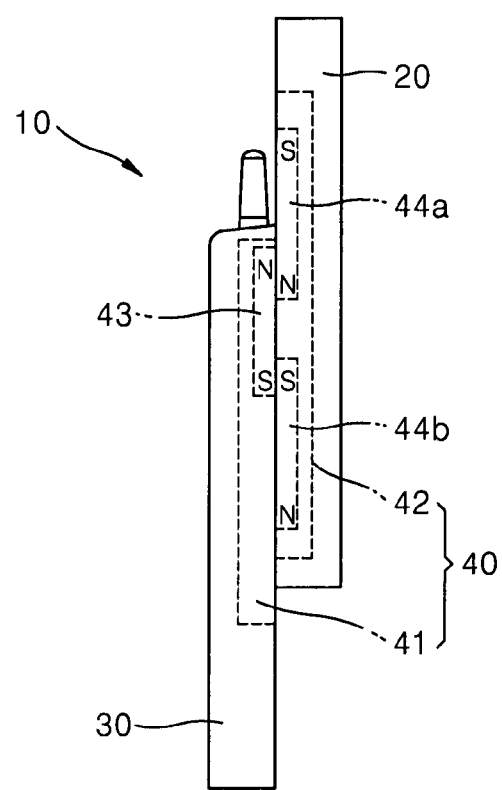
FIG. 1B is a partial see-through side view of the conventional mobile phone of FIG. 1A.
Figure 1C:
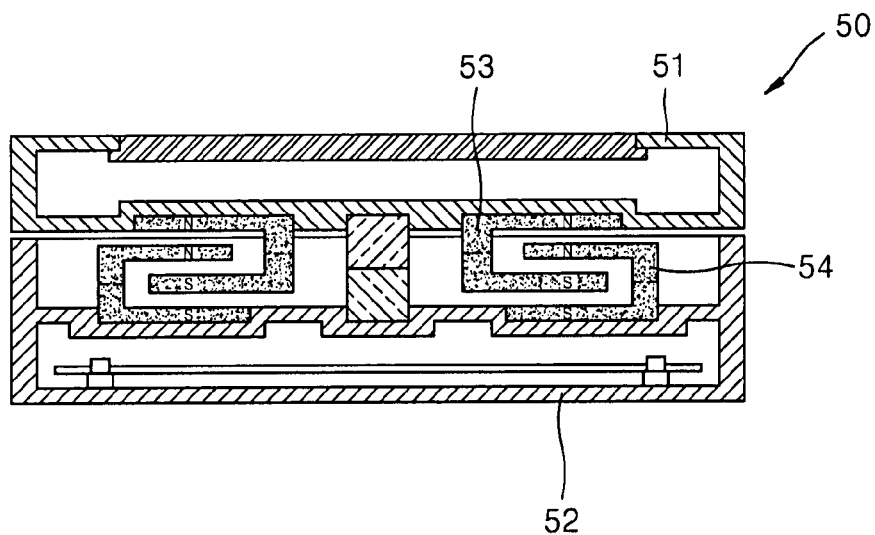
FIG. 1C is a cross-sectional view illustrating another conventional sliding structure.
Figure 2:
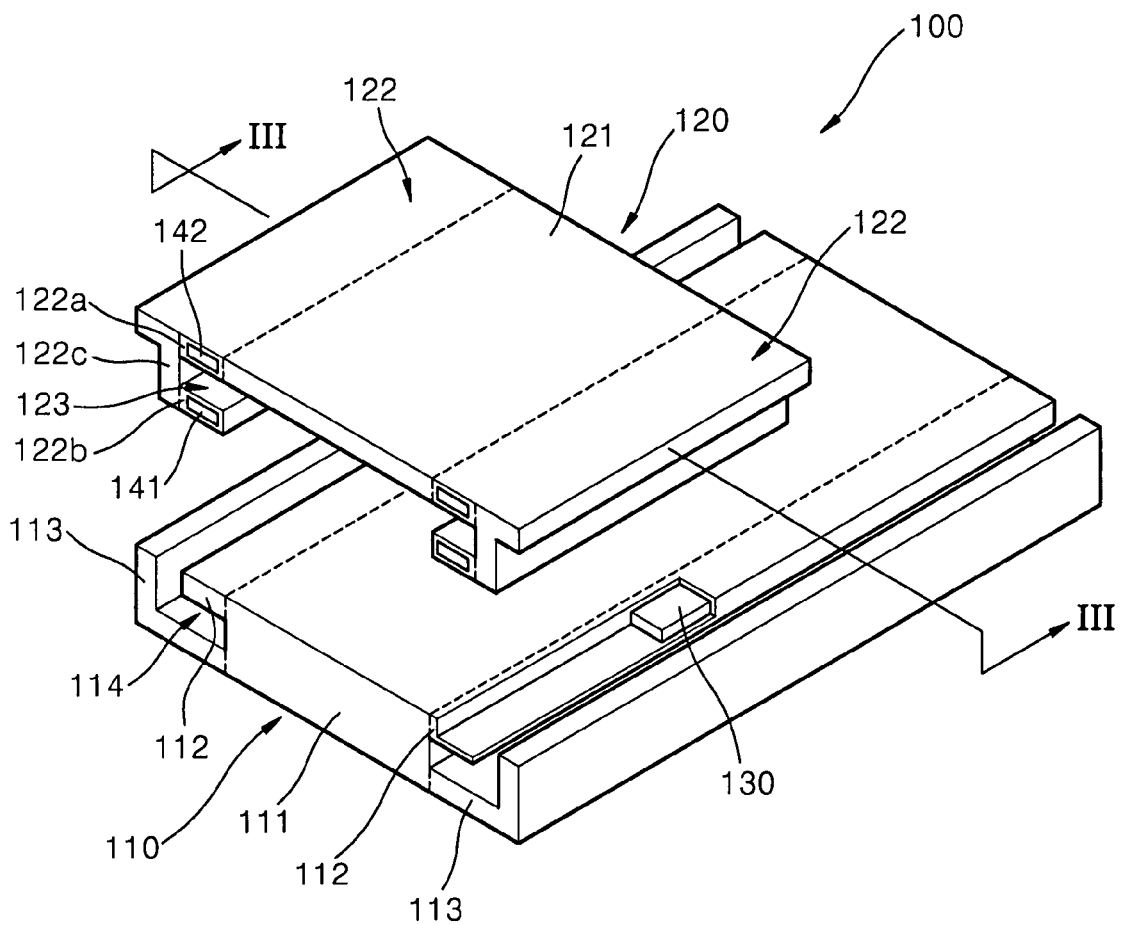
FIG. 2 is a partially-exploded perspective view of a sliding structure according to an embodiment of the present invention.
Figure 3:
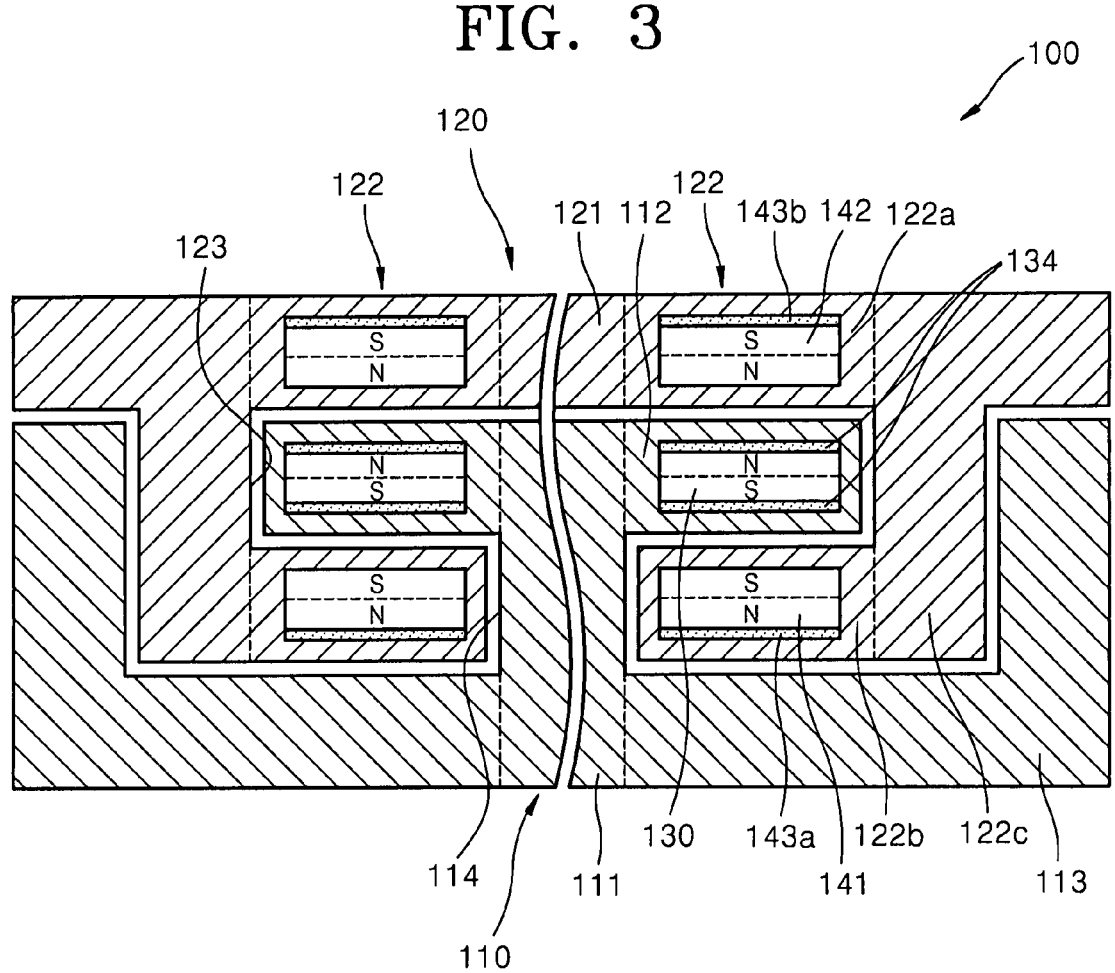
FIG. 3 is a cross-sectional view of the sliding structure of FIG. 2 taken along line III-III.

Referring to FIGS. 2 and 3, a sliding structure 100 for a mobile electronic device includes a first slider member 110 with first magnet units 130; and a second slider member 120 with second magnet units 141 and 142. Hereinafter, although the sliding structure 100 is described in operation with the first sliding member 110 being relatively stationary and the second slider member 120 sliding on the first slider member 110, it should be appreciated that the first and second sliding member 110, 120 move relative to each other. To this end, the sliding structure 100 may be operated by holding the second slider member 120 generally stationary and sliding the first slider member 110 on the second slider member 120. Furthermore, it should be appreciated that the terms up, upward, down, downward, top, bottom, right and left are used herein for sake of convenience of description and are not intended as limiting the present sliding structure 100 to a particular orientation, configuration or operation. Moreover, since the sliding structures 100, 200 shown and described herein are substantially right-left, mirror-image symmetric, only one side of the structures 100, 200 will be described for brevity.

The first slider member 110 is formed of a non-magnetic material (e.g., aluminium alloy, plastic, synthetic resin, etc.) and includes a support portion 111, guide portions 112, and auxiliary receiving portions 113.

The support portion 111 has a generally rectangular parallelepiped shape. The guide portions 112 extend outward from both sides of the support portion 111 such that the upper surfaces of the guide portions 112 are substantially coplanar with the top surface of the support portion 111. The guide portions 112 extend along substantially an entire length of the support portion 111.

The auxiliary receiving portions 113 extend outward from the sides of the support portion 111 past the outward edges of the guide portions 112 and then the auxiliary receiving portions 113 extend upward toward the guide portions 112 so that the auxiliary receiving portions 113 have generally L-shaped cross-sections. Bottom surfaces of the auxiliary receiving portions 113 are substantially coplanar with the bottom surface of the support portion 111 so that each of the auxiliary receiving portions 113 is spaced by a predetermined distance from each of the proximate guide portions 112. The auxiliary receiving portions 113 extend along substantially an entire length of the support portion 111. According to the configuration of the guide portions 112 and the auxiliary receiving portions 113, first receiving grooves 114 are defined on right and left sides of the support portion 111.

While the auxiliary receiving portions 113 extend outward and upward from right and left sides of the support portion 111 in FIGS. 2 and 3, the present embodiment is not limited thereto. That is, the auxiliary receiving portions 113 may extend from the bottom surface of the support portion 111 or be configured otherwise.

The support portion 111, the guide portion 112, and the auxiliary receiving portion 113 may be manufactured by various methods known in the art. For example, they may be manufactured by die casting or by bending a plate-shaped material and making the bent plate-shaped material subjected to plastic deformation. Additionally, they may be otherwise formed or molded so that the portions 111, 112, 113 are integral or unitary.

The second slider member 120 is formed of a non-magnetic material (e.g., aluminium alloy, plastic, synthetic resin, etc.) and includes a base portion 121 and receiving portions 122. The second slider member 120 may be made of the same or of a different material as the first slider member 110. As shown in FIGS. 2 and 4-10, the second slider member 120 has a length that is approximately half the length of the first slider member 110. However, the second slider member 120 may be configured otherwise.

The base portion 121 has a generally planar shape. The receiving portions 122 extend from both sides of the base portion 121. The receiving portions 122 extend along substantially an entire length of the base portion 121.

The receiving portions 122 are configured to have complementary shapes to slidably mate with the guide portions 112 (and, optionally, the auxiliary receiving portions 113) of the first slide member 110. As shown, the receiving portions 122 each include a first receiving portion 122a, a second receiving portion 122b, and a connecting portion 122c. The first receiving portion 122a is generally coplanar with the base portion and extends outward from an edge thereof. The second receiving portion 122b is parallel with, spaced apart from and directly aligned under the first receiving portion 122a. The connecting portion 122c extends downward from the first receiving portion 122a and connects the second receiving portion 122b and the first receiving portion 122a. As is best shown in FIGS. 2 and 3, the first receiving portion 122a, second receiving portion 122b, and connecting portion 122c are configured so that the receiving portions 122 have generally J-shaped cross-sections.

The first receiving portion 122a, the second receiving portion 122b, and the connecting portion 122c cooperatively define a second receiving groove 123. When the sliding structure 100 is assembled, the first and second slider members 110, 120 are prevented from decoupling from each other by an interference fit that is provided by the guide portion 112 being inserted into the second receiving groove 123 and the second receiving portion 122b (and a part of the connecting portion 122c) being inserted into the first receiving groove 114. In this way, the receiving portions 122 and guide portions 112 guide relative sliding movement of the slider members 110, 120.

The base portion 121 and the receiving portions 122 may be manufactured by various methods known in the art. For example, the base portion 121 and the receiving portions 122 may be manufactured by die casting or by bending a plate-shaped material and making the bent plate-shaped material subjected to plastic deformation. Additionally, they may be otherwise formed or molded so that the portions 121, 122a, 122b, 122c are integral or unitary.

To further reduce a friction, a lubricant may be coated on surfaces of the guide portions 112, inner surfaces of the receiving portions 122, and inner surfaces of the auxiliary receiving portions 113 where contact may occur during the sliding operation. For example, a ceramic material may be coated on the surfaces where the contacts may occur during the sliding operation. Alternatively, one or more of the guide portions 112, auxiliary receiving portions 113 and receiving portions 122 may be made of a material (e.g., plastic, ceramic, glass, etc.) having inherent lubricity.

Each of the first magnet units 130 is coupled with a guide portion 112. As is best illustrated in FIGS. 2, 4, 6, 8 and 10, the first magnet unit 130 is configured at a middle position of a sliding stroke of the guide portion 112 (i.e., in a central portion of the guide portion 112, spaced away from the ends thereof) such that the first magnet unit 130 extends through about half a length of the guide portion 112 (and support portion 111). However, the first magnet unit 130 may be configured otherwise, for example, offset from a central portion of the guide portion 112 and/or extending further toward one or more of the ends of the guide portion 112 for facilitating sliding movement.

While the first magnet unit 130 is a single permanent magnet, the present embodiment is not limited thereto. That is, the first magnet units 130 may be electromagnets.

Although the first magnet unit 130 is substantially enclosed in or otherwise configured in the guide portion 112 as shown in FIGS. 2 and 3, the present embodiment is not limited thereto. That is, the first magnet unit 130 may be configured on one or more surfaces of the guide portion 112.

Figure 4:
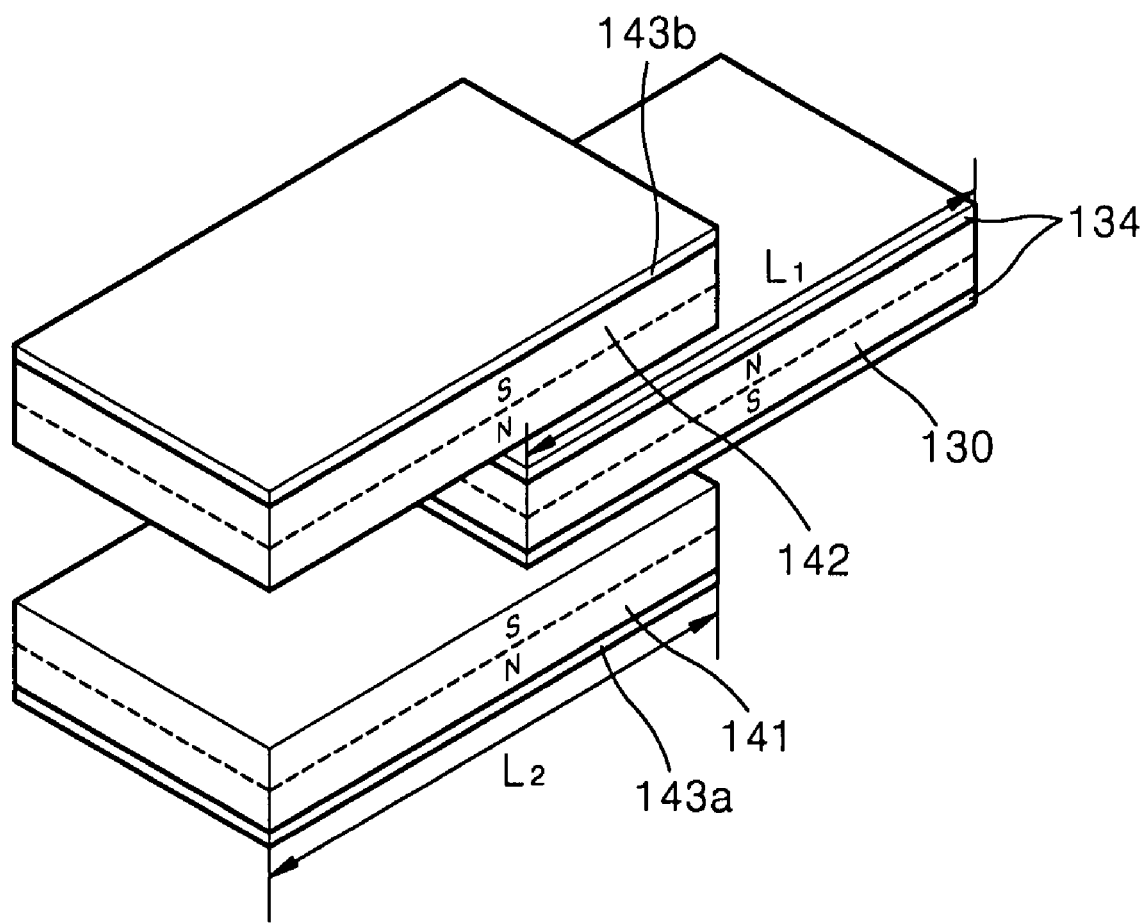
FIG. 4 is a perspective view illustrating a configuration of a first magnet unit and second magnet units of the sliding structure of FIG. 2.

Referring to FIG. 4, the length $L_1$ of the first magnet unit 130 is substantially similar as the length $L_2$ of the second magnets 141 and 142. However, the present embodiment is not limited thereto. That is, the length $L_1$ of the first magnet unit 130 is not limited to being substantially similar as the length $L_2$.

The first magnet unit 130 has a rectangular parallelepiped shape, and the magnetic poles of the first magnet unit 130 are arranged in a direction perpendicular to a sliding direction (i.e., the sliding direction being defined by an axis that is generally parallel to the length of the first slide member 110) such that the N pole is higher in location (i.e., facing the second slide member 120) than the S pole.

Although the magnetic poles of the first magnet unit 130 are arranged such that the N pole is higher in location than the S pole as shown in FIGS. 3 and 4, the present embodiment is not limited thereto. Alternatively, the magnetic poles of the first magnet unit 130 may be arranged oppositely (i.e., with the N and S poles being reversed) to the illustrated arrangement. That is, the magnetic poles of the first magnetic unit 130 may be arranged such that the S pole is higher than the N pole. In this case, however, the magnetic poles of the second magnet units 141 and 142 should be oppositely arranged as well according to the changed magnetic poles of the first magnet unit 130.

Magnetic shields 134 may be configured on top and bottom surfaces of the first magnet unit 130.

Although the magnetic shields 134 are configured on the top and bottom surfaces of the first magnet unit 130 as shown in FIG. 4, the present embodiment is not limited thereto. That is, magnetic shields may be additionally configured on side and/or end surfaces of the first magnet unit 130. Furthermore, the magnetic shields 134 may not be directly disposed on the first magnet unit 130, and may interposed between the first magnet unit 130 and second magnet units 141, 142 by, for example, disposing magnetic shields on the guide portions 112 to which the first magnet units 130 are coupled or on one or more surfaces of the receiving portion 122 to which the second magnet units 141, 142 are coupled. The magnetic shields 134 may be configured at one or more positions along a length of the guide portion 112, after which the first magnet unit 130 may be configured on the guide portions 112.

The magnetic shields 134 may be formed of a ferromagnetic substance to shield magnetic lines of force generated from the first magnet units 130. The ferromagnetic substance may be, for example, an AD-MU alloy. Although the magnetic shields 134 may be formed of a ferromagnetic substance, the present embodiment is not limited thereto. That is, the magnetic shields 134 may be formed of a non-magnetic substance.

Each pair of second magnet units 141 and 142 are coupled with a receiving portion 122.

Figure 6:
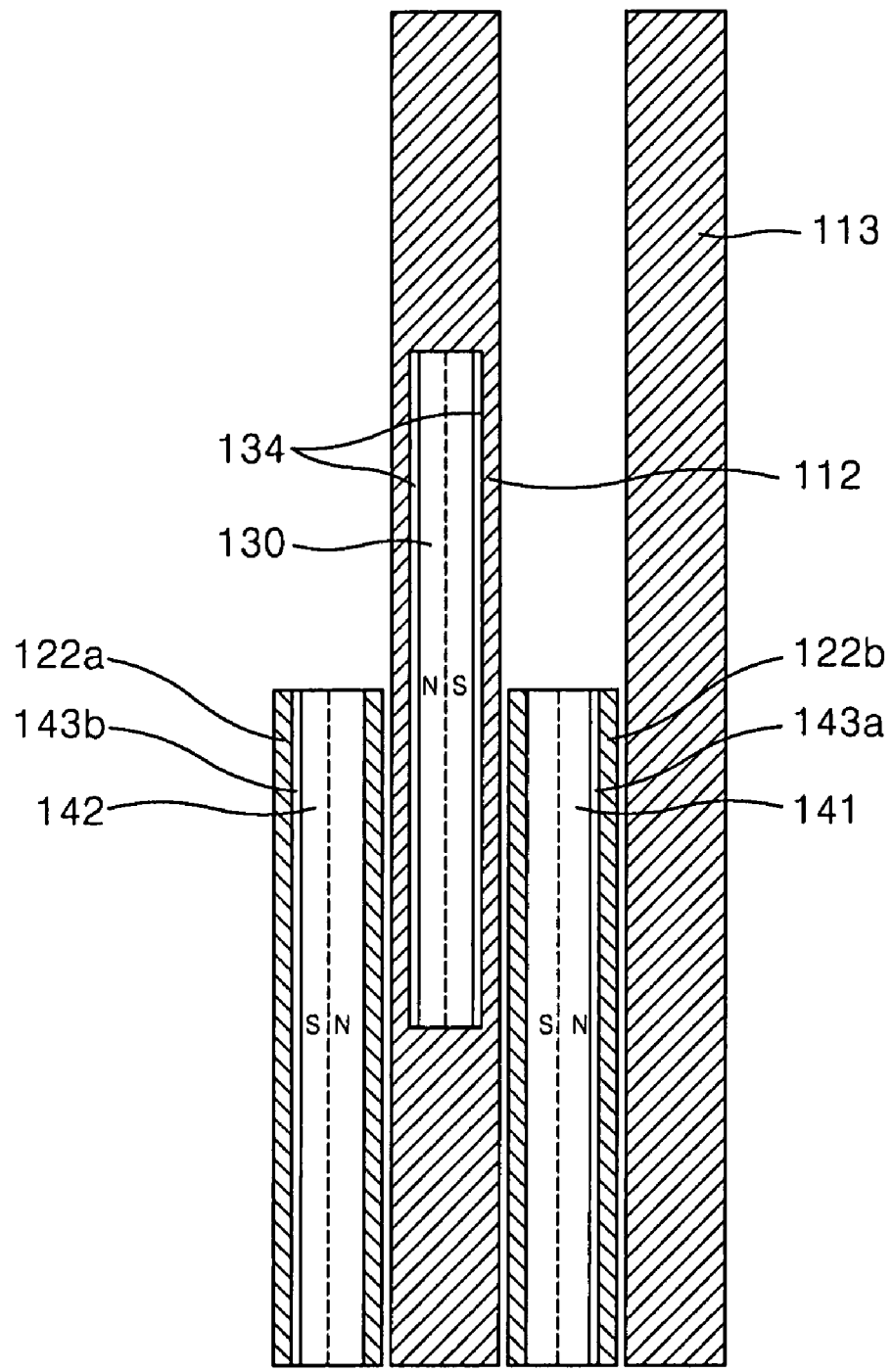
FIG. 6 is a cross-sectional view of the sliding structure of FIG. 5 taken along line VI-VI.

While the second magnet units 141 and 142 have the length equal to the length of the second slider member 120 in FIG. 6, the present embodiment is not limited thereto. That is, the second magnet units 141 and 142 may be shorter than the second slider member 120.

While the second magnet units 141 and 142 are permanent magnets, the present embodiment is not limited thereto. That is, the second magnet units 141 and 142 may be electromagnets.

Although the second magnet units 141 and 142 are substantially enclosed in or otherwise configured in the receiving portion 122 as shown in FIGS. 2 and 3, the present embodiment is not limited thereto. That is, the second magnet units 141 and 142 may be configured on one or more surfaces of the receiving portion 122 (e.g., on the portions 122a, 122b).

The second magnet units 141 and 142 have a rectangular parallelepiped shape, and are respectively configured in the second receiving portion 122b and the first receiving portion 122a such that the first magnet unit 130 is configured therebetween when the slide members 110, 120 of the sliding structure 100 are assembled. As can be appreciated, the second magnet units 141 and 142 and the first magnet unit 130 magnetically interact with each other to facilitate a sliding operation of the slider members 110, 120.

The magnetic poles of the second magnet units 141 and 142 are arranged in a direction perpendicular to the sliding direction. Furthermore, the magnetic poles of the second magnet units 141 and 142 are arranged in the same order to have the same polarity. That is, both the magnetic poles of the second magnet units 141 and 142 are arranged such that the S poles are higher in location than the N poles as shown in FIGS. 3 and 4.

The order of the magnetic poles of the second magnet units 141 and 142 is opposite to the order of the magnetic poles of the first magnet unit 130 so that a repelling force can act between the first magnet unit 130 and the second magnet units 141 and 142 to aid the sliding operation.

The first magnet unit 130 and the second magnet units 141 and 142 are arranged so that an imaginary line, which is perpendicular to the lengths of the second magnet units 141 and 142 and which connects facing surfaces of the second magnet units 141 and 142, can pass through a part of the first magnet unit 130 during the sliding operation. That is, even when the second slider member 120 is moved to its end positions (i.e., the initial and final positions), generally planar top and bottom surfaces of the first magnet unit 130 overlap with generally planar top and bottom surfaces of the second magnet units 141, 142. In this sliding structure 100, a repelling force acts between the first magnet unit 130 and the second magnet units 141 and 142. Accordingly, a friction is minimized when the second slider member 120, which includes the second magnet units 141 and 142, slides on the first slider member 110, which includes the first magnet unit 130, since the second slider member 120 is elevated from the first slider member 110 due to the repelling force. In this case, the degree to which the second slider member 120 is raised is related to a magnetic force, and particularly, to the dimensions and properties of the magnets being used.

Although the first magnet unit 130 and the second magnet units 141 and 142 are arranged so that the imaginary line, which is perpendicular to the lengths of the second magnet units 141 and 142 and connects the facing surfaces of the second magnet units 141 and 142, can pass through at least the part of the first magnet unit 130 during the sliding operation as described above, the present embodiment is not limited thereto. That is, the perpendicular imaginary line may not pass through the first magnet unit 130. For example, if the length of the first magnet unit 130 or the lengths of the second magnet units 141, 142 were shorter, then the imaginary line may not pass through the magnet units 130, 141, 142 such as when the second slider member 120 is oriented one of its end positions (i.e., the initial and final positions). In this case, however, the first magnet unit 130 and the second magnet units 141 and 142 may be arranged so that a repelling force can act between the first magnet unit 130 and the second magnet units 141 and 142 by reducing the distance between the first magnet unit 130 and the second magnet units 141 and 142 as much as possible, in order to reduce a friction during the sliding operation.

As shown in FIGS. 3 and 4, magnetic shields 143a and 143b are configured on a bottom surface of the second magnet unit 141 and a top surface of the second magnet unit 142, respectively.

The material and function of the magnetic shields 143a and 143b may be substantially similar as the material and function of the magnetic shields 134. Accordingly, a detailed explanation thereof will not be repeated.

While the magnetic shields 143a and 143b are configured on the bottom surface of the second magnet unit 141 and the top surface of the second magnet unit 142, respectively, in FIG. 4, the present embodiment is not limited thereto. That is, the magnetic shields may be configured on a top surface of the second magnet unit 141 and a bottom surface of the second magnet unit 142, respectively. Furthermore, the magnetic shields may be additionally or alternatively configured on side and/or end surfaces of the second magnets 141 and 142. The magnetic shields 143a and 143b may not be directly disposed on the second magnet units 141 and 142, and may be disposed on one or more exterior surfaces of the receiving portions 122 that substantially enclose the second magnet units 141 and 142. In this case, the magnetic shields 143a and 143b may be first disposed at appropriate positions of the receiving portion 122, and then the second magnet units 141 and 142 may be configured in the receiving portion 122.

While the first slider member 110 is longer than the second slider member 120 in FIG. 2, the present embodiment is not limited thereto. That is, the first slider member 110 may be shorter than the second slider member 120.

When the sliding structure 100 configured as described above is used in a mobile electronic device (e.g., such as a mobile phone, a camera, a portable multimedia player (PMP), etc.) the sliding operation is performed in such a manner that one of the first slider member 110 and the second slider member 120 is embedded in a main body of the device (e.g., in which electrical components, such as batteries, or main chipsets of the electronic device are integrated), whereas the other one of the first slider member 110 and the second slider member 120 is embedded in a sub body of the device (e.g., a portion having a relatively simple structure).

One of the first slider member 110 and the second slider member 120 may be formed by directly processing the main body, and the other one of the first slider member 110 and the second slider member 120 may be formed by directly processing the sub body. In this case, the occupied area can be reduced, and thus the sliding type mobile electronic device can be made thin.

An example operation of the sliding structure 100 constructed as described above will now be explained.

Figure 5:
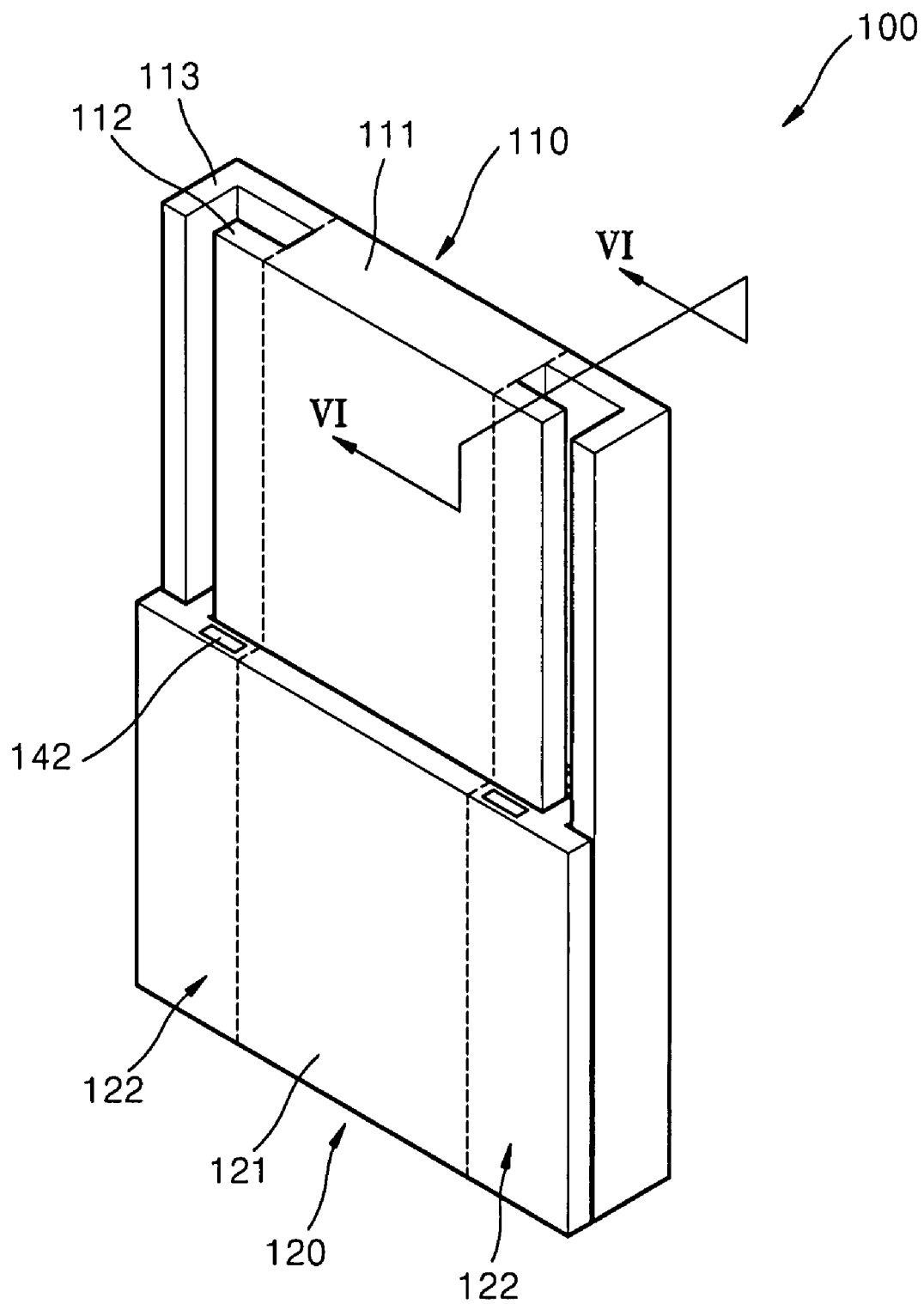
FIG. 5 is a perspective view illustrating an assembled view of the sliding structure of FIG. 2 with the second slider member being oriented at an initial position.
Figure 7:
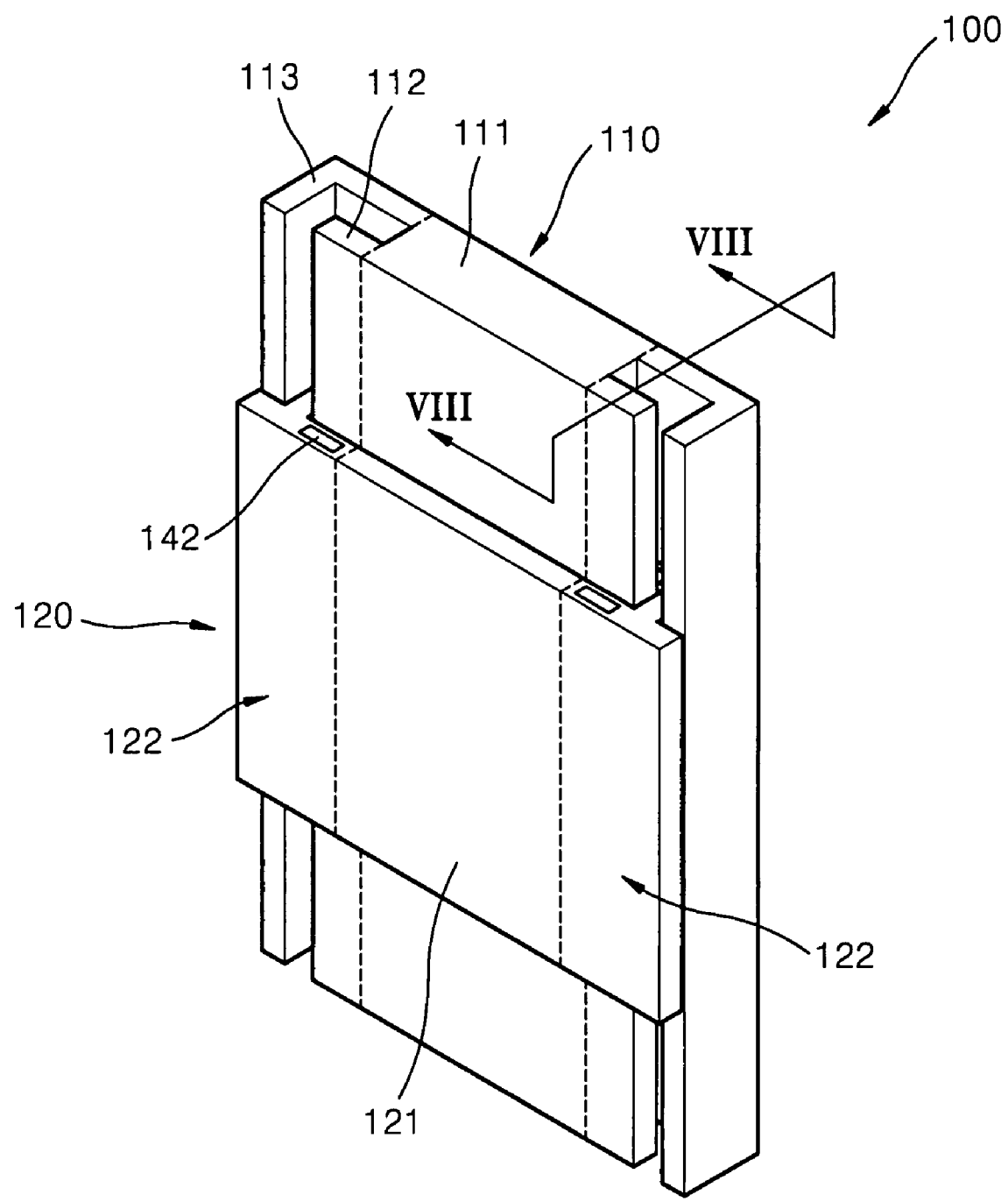
FIG. 7 is a perspective view illustrating an assembled view of the sliding structure of FIG. 2 with the second slider member being oriented at an intermediate position.
Figure 8:
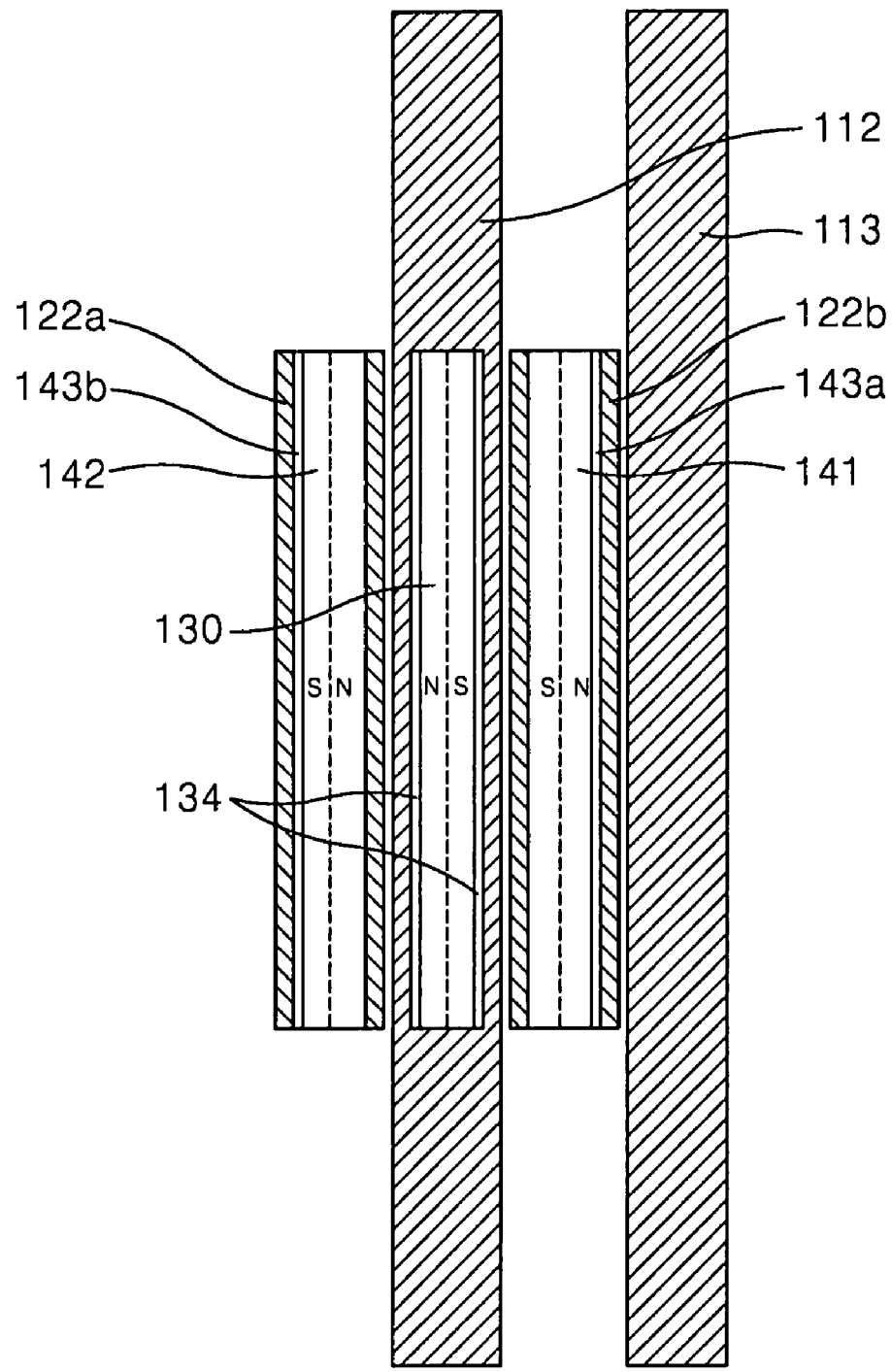
FIG. 8 is a cross-sectional view of the sliding structure of FIG. 7 taken along line VIII-VIII.
Figure 9:
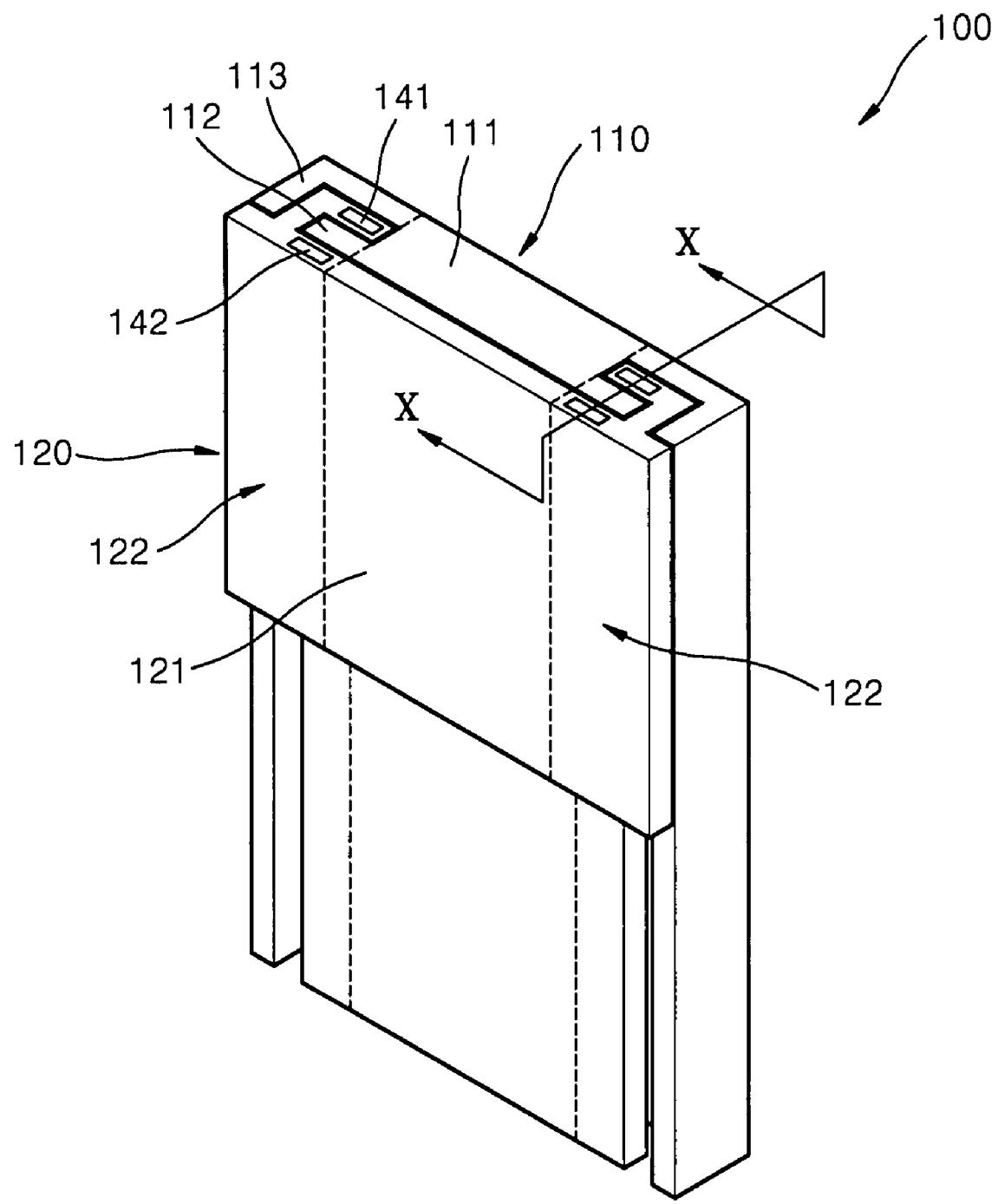
FIG. 9 is a perspective view illustrating an assembled view of the sliding structure of FIG. 2 with the second slider member being oriented at a final position.
Figure 10:
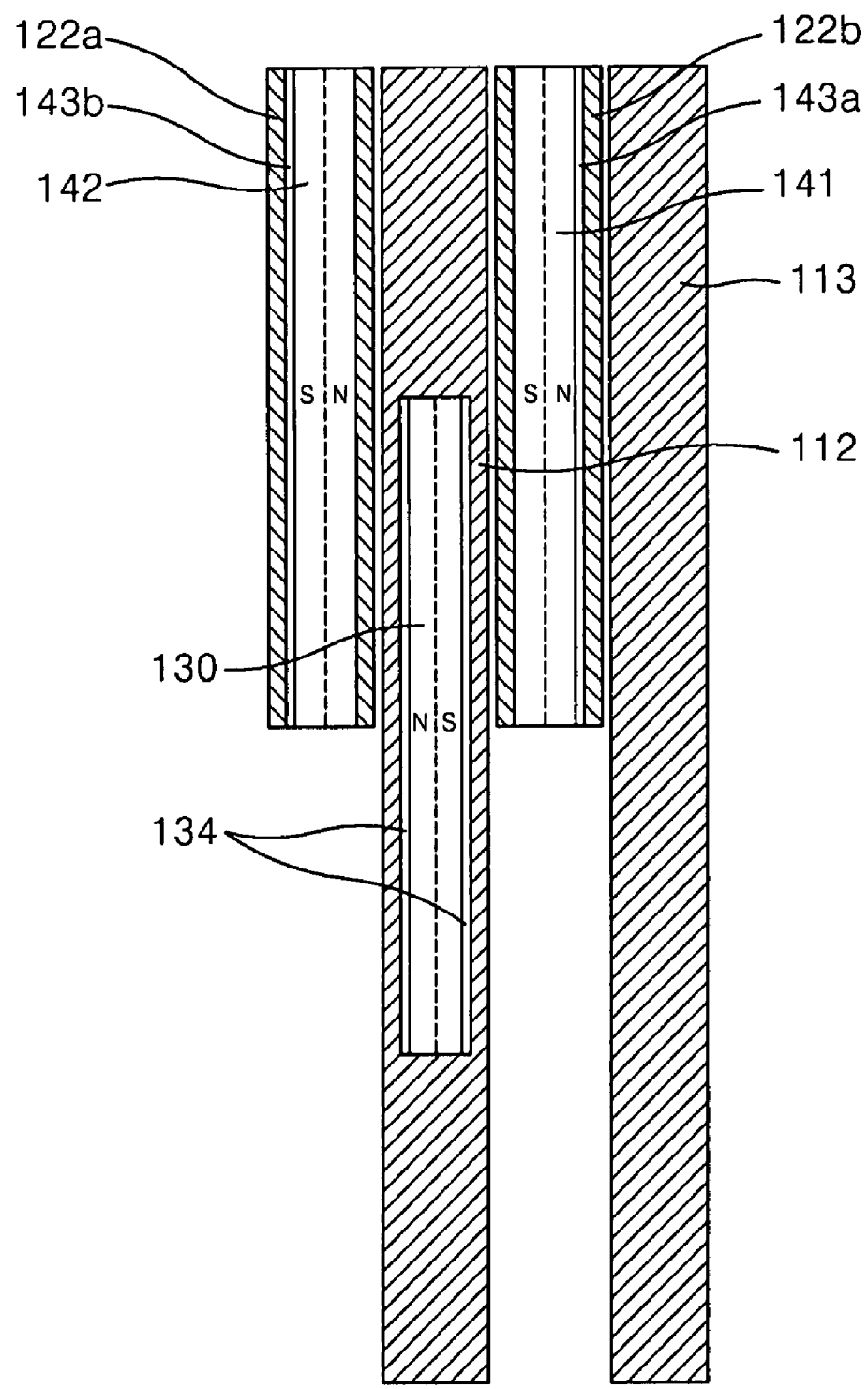
FIG. 10 is a cross-sectional view of the sliding structure of FIG. 9 taken along line X-X.

FIG. 5 is a perspective view illustrating that the second slider member 120 is disposed at an initial position. FIG. 6 is a cross-sectional view taken along line VI-VI of FIG. 5. FIG. 7 is a perspective view illustrating that the second slider member 120 is disposed at an intermediate position. FIG. 8 is a cross-sectional view taken along line VIII-VIII of FIG. 7. FIG. 9 is a perspective view illustrating that the second slider member 120 is disposed at a final position. FIG. 10 is a cross-sectional view taken along line X-X of FIG. 9. Although the terms initial and final are used herein, it should be appreciated that these are used for convenience of description and are not meant to be limiting to the operation of the present sliding structure 100. Indeed, it should be appreciated that the initial and final positions or orientations discussed hereinafter may be reversed.

Referring to FIGS. 5 and 6, the second slider member 120 is disposed at an initial position. In the initial position, the second slider member is disposed at a lower position of the first slider member 110.

Referring to FIG. 6, a part (e.g., approximately half) of the first magnet unit 130 is disposed between the second magnet units 141 and 142. In this case, a repelling force acts between the second magnet units 141 and 142 and the first magnet unit 130 due to the polarity of the second magnet units 141 and 142 and an opposite polarity of the first magnet unit 130.

Due to the repelling force, the second slider member 120 can be stably disposed at the initial position. Furthermore, the second slider member 120 is somewhat elevated from the first slider member 110, thereby reducing a friction in a subsequent sliding operation.

When a user slides the second slider member 120 up from the initial position of FIGS. 5 and 6 toward the intermediate position, the second magnet units 141 and 142 move upward until the first magnet unit 130 becomes disposed there between. Accordingly, the repelling force between the second magnet units 141 and 142 and the first magnet unit 130 increases.

Even though the user may quickly slide the second slider member 120 up, the repelling force acts between the second magnet units 141 and 142 and the first magnet unit 130, thereby preventing the second slider member 120 from moving suddenly. Accordingly impacts on the sliding structure 100 can be prevented or substantially minimized. Also, since the second slider member 120 is elevated from the first slider member 110 due to the repelling force, a friction can be reduced during the sliding operation.

When the user continues to slide the second slider member 120 up from the initial position, the second slider member 120 of the sliding structure 100 reaches an intermediate state as shown in FIGS. 7 and 8.

Referring to FIG. 8, since substantially an entire length of the first magnet unit 130 is disposed between the second magnet units 141 and 142, a strong repelling force acts between the second magnet units 141 and 142 and the first magnet unit 130. This repelling force facilitates moving the second slider member 120 from the intermediate position toward the initial and final positions.

Accordingly, when the second slider member 120 is oriented in or proximate to the intermediate position of FIGS. 7 and 8, the user can slide the second slider member 120 up with little difficulty due to the repelling force between the second magnet units 141 and 142 and the first magnet unit 130.

In this case, since sliding of the second slider member 120 is facilitated, excessive impacts on the sliding structure 100 (e.g., due to a user exerting a force) can be prevented. Also, since the second slider member 120 is raised from the first slider member 110 due to the repelling force, a friction can be reduced during the sliding operation.

When the user continues to slide the second slider member 120 up, the second slider member 120 of the sliding structure 100 reaches a final position as shown in FIGS. 9 and 10

Referring to FIG. 9, a repelling force acts between the second magnet units 141 and 142 and the first magnet unit 130 due to the arrangement of the magnetic poles (i.e., polarity) of the second magnet units 141 and 142 and the arrangement of the magnetic poles of the first magnet unit 130.

Due to the repelling force, the second slider member 120 can be stably disposed or positively held at the final position. Furthermore, the second slider member 120 is somewhat elevated from the first slider member 110, thereby reducing a friction when the user slides the second slider member 120 down again.

As previously mentioned, although the second slider member 120 is slid up from an initial position to a final position as illustrated in FIGS. 5 through 10, the present embodiment is not limited thereto. That is, the second slider member 120 may be slid down from an initial position being the final position of FIGS. 9 and 10 to a final position being the initial position of FIGS. 5 and 6.

Since the sliding structure 100 is configured as described above, excessive impacts, which may occur during the sliding operation, can be avoided or substantially minimized.

Also, since the sliding structure 100 may be manufactured by forming either the first slider member 110 or the second slider member 120 by directly processing a main body of a device and forming the other by directly processing a sub body of the device, the occupied area can be reduced so that the mobile electronic device can be made thin.

Also, the sliding structure 100 configured as described above can be raised by a magnetic force, a friction can be reduced during the sliding operation and thus a force necessary for handing the sliding structure 100 can be reduced.

Another sliding structure will now be explained with reference to FIGS. 11 through 14.

Figure 11:
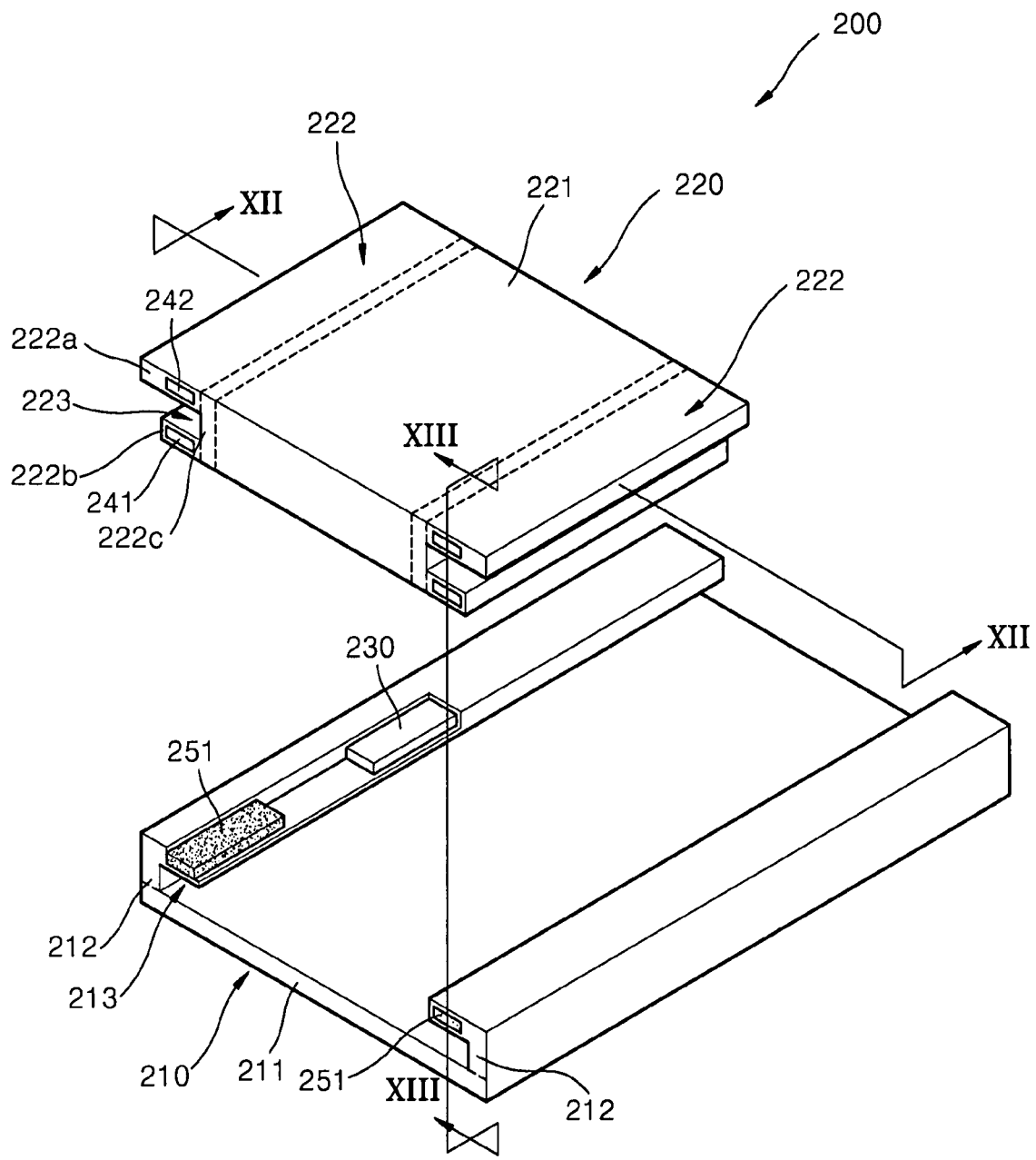
FIG. 11 is a partially-exploded perspective view illustrating a sliding structure according to another embodiment of the present invention.
Figure 12:
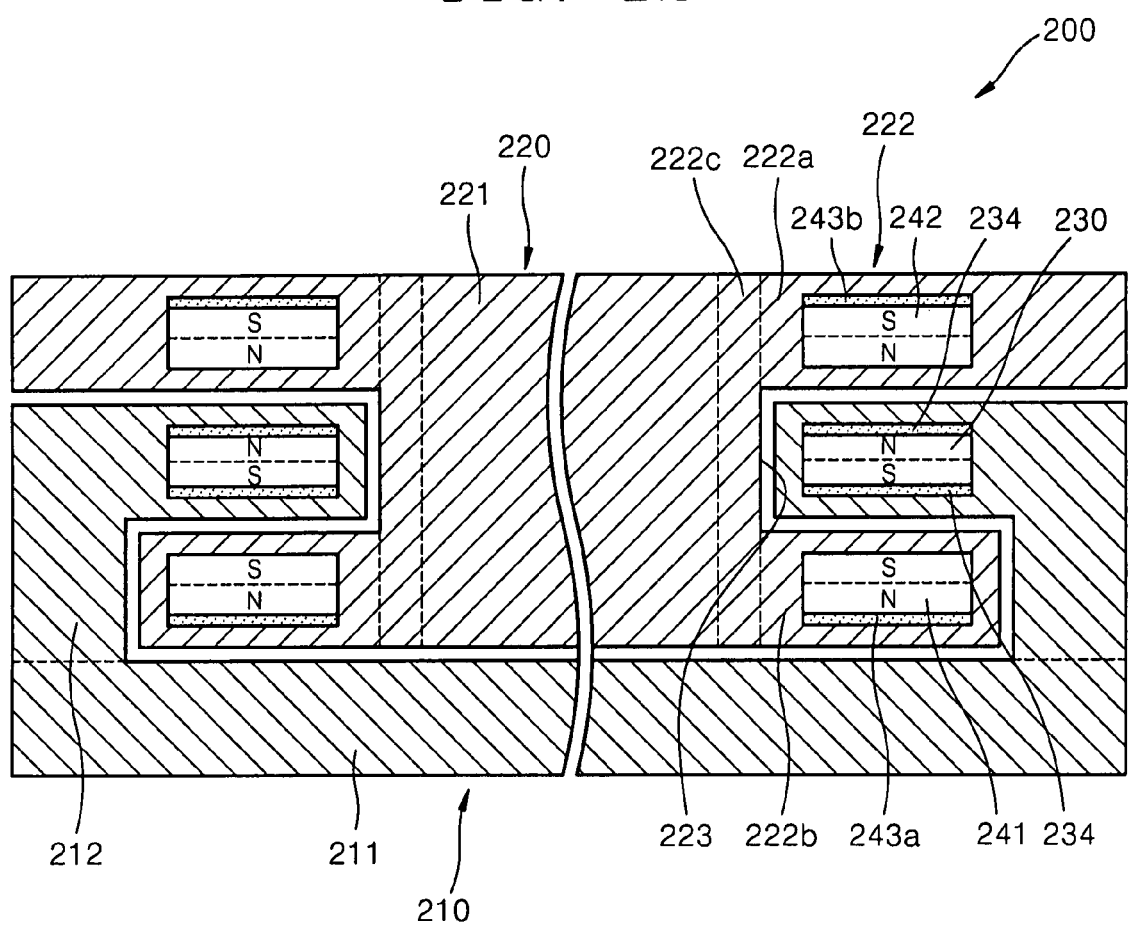
FIG. 12 is a cross-sectional view of the sliding structure of FIG. 11 taken along line XII-XII.
Figure 13:
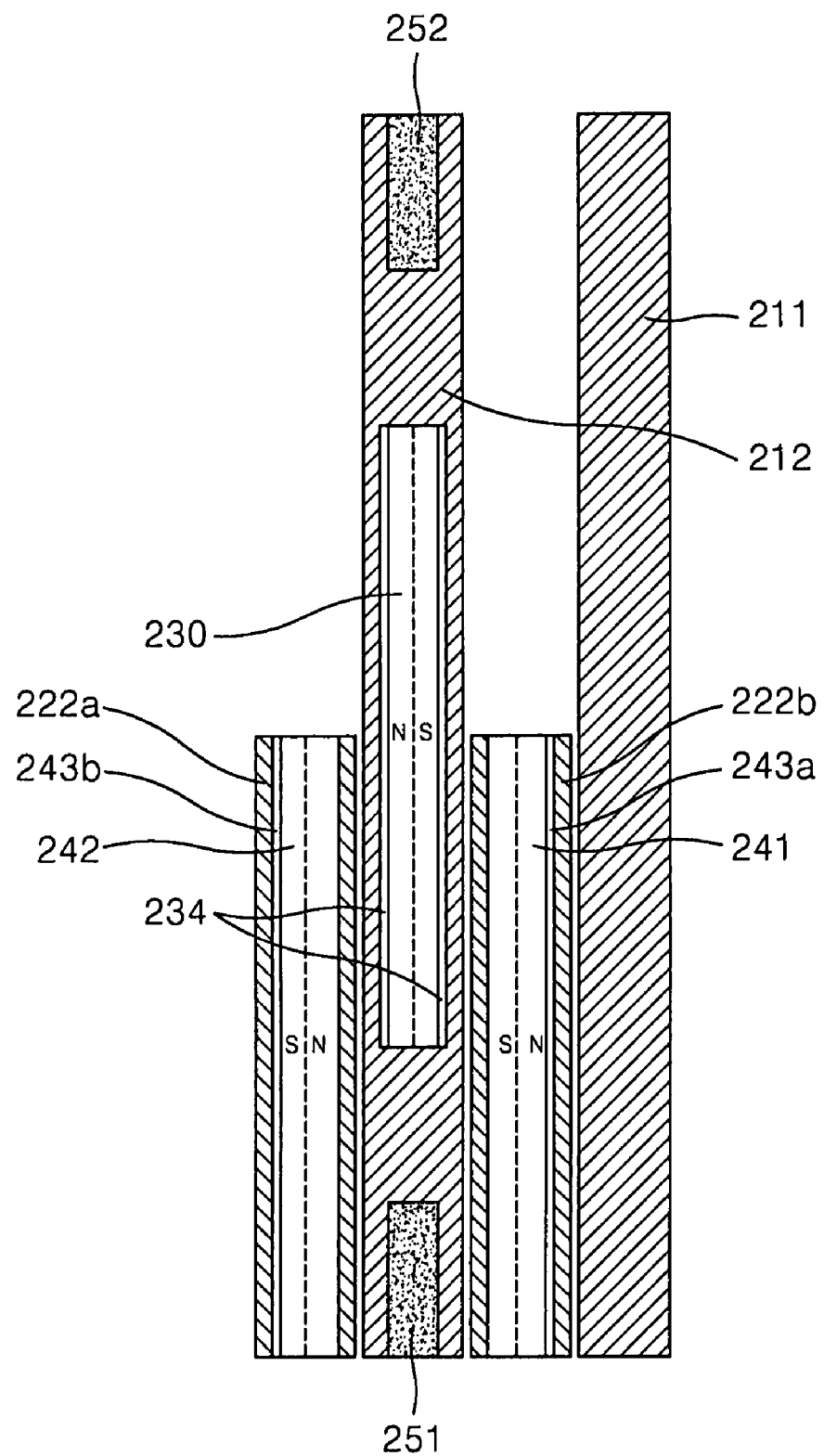
FIG. 13 is a cross-sectional view of the sliding structure of FIG. 11 taken along line XIII-XIII.
Figure 14:
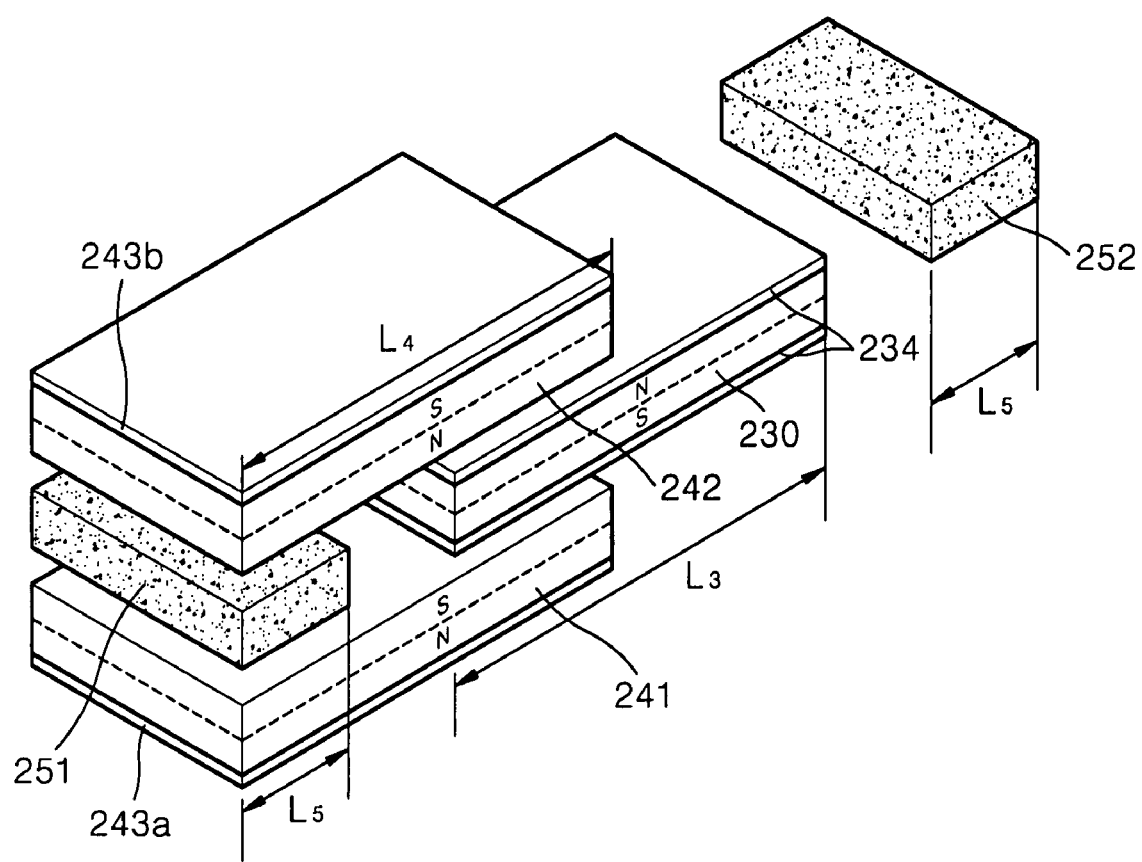
FIG. 14 is a perspective view illustrating a configuration of a first magnet unit and second magnet units of the sliding structure of FIG. 11.

FIG. 11 is an exploded perspective view of a sliding structure according to another embodiment of the present invention. FIG. 12 is a cross-sectional view taken along line XII-XII of FIG. 11. FIG. 13 is a cross-sectional view taken along line XIII-XIII of FIG. 11. FIG. 14 is an exploded perspective view illustrating that a first magnet unit and second magnet units of the sliding structure of FIG. 11 are arranged.

Referring to FIGS. 11 and 12, a sliding structure 200 for a mobile electronic device includes a first slider member 210 with first magnet units 230, and a second slider member 211 with second magnet units 241 and 242.

The first slider member 210 may be formed of a non-magnetic material (e.g., synthetic resin, plastic, aluminium, etc.) and includes a support portion 211 and guide portions 212.

The support portion 211 has a generally planar shape. The guide portions 212 extend from both sides of the support portion 211.

The guide portions 212 include a bottom portion that extends perpendicularly upward from a top surface of the support portion 211 and a top portion that extends inward from the first portion and generally parallel with the support portion 211 such that the guide portions 212 have generally L-shaped cross-sections. A first receiving groove 213 is defined between the top portion of the guide portion 212 and the support portion 211.

The second slider member 220 may be formed of a non-magnetic material (e.g., aluminium alloy, synthetic resin, plastic, etc.) and includes a base portion 221 and receiving portions 222. The first and second slider members 210, 220 may be made of the same or different materials.

The base portion 221 has a generally rectangular parallelepiped shape. The receiving portions 222 extend from both sides of the base portion 221. As with the first embodiment 100 of the sliding structure, the guide portions 212 the receiving portions 222 are configured to have complementary shapes to facilitate slidable mating of the first and second slider members 210, 220.

The receiving portions 222 each include a first receiving portion 222a with an upper surface that is generally coplanar with an upper surface of the base portion 221, a second receiving portion 222b with a lower surface that is generally coplanar with a lower surface of the base portion 221, and a connecting portion 222c that is generally perpendicular to the first and second receiving portions 222a, 222b for connecting the portions 222a, 222b. As shown in FIG. 11, the portions 222a, 222b and 222c of the receiving portions 222 are configured so that the receiving portions have generally C-shaped, horseshoe-shaped or sideways U-shaped cross-sections.

The first receiving portion 222a and the second receiving portion 222b are parallel to and spaced apart from each other, and the connecting portion 222c connects the first receiving portion 222a and the second receiving portion 222b together and to the base portion 221. The portions 222a, 222b and 222c may be integrally or unitarily formed with the base portion 221.

The first receiving portion 222a, the second receiving portion 222b, and the connecting portion 222c cooperatively define a second receiving groove 223. When the sliding structure 200 is assembled, the guide portion 212 is inserted into the second receiving groove 223 and the second receiving portion 222b of the receiving portion 222 is inserted into the first receiving groove 213, so as to guide a sliding operation.

Each of the first magnet units 230 is configured in a guide portion 212. Furthermore, the second magnet units 241 and 242 are respectively configured in the second receiving portion 222b and the first receiving portion 222a so that the magnet units 241, 242 are parallel with each other, spaced apart from each other and directly aligned.

The first magnet unit 230 of FIGS. 11 through 14 may have a substantially similar structure as the first magnet unit 130 of FIGS. 1 through 10. That is, the first magnet unit 230 may be identical to the first magnet unit 130 in shape, location/configuration relative to the ends of the guide portions 112, 212 and the direction and order of magnetic poles (i.e., polarity).

Furthermore, at least one ferric or ferromagnetic member (e.g., a pair of ferromagnetic members 251 and 252 as shown) may be coupled with the guide portion 212 in a spaced-away relation to the first magnet unit 230. As shown in FIGS. 13 and 14, the first magnet unit 230 may be configured in a generally central portion of the guide portion 212 such that the first magnet unit 230 is between the ferromagnetic members 251 and 252.

The ferromagnetic members 251 and 252 are formed of a ferromagnetic or ferric material, such as iron, for example. The members 251, 252 have a generally rectangular parallelepiped shape, and each member 251, 252 is spaced apart from the first magnet unit 230 by a predetermined distance. Although the members 251, 252 are illustrated as being substantially similarly spaced apart from the first magnet unit 230, one or both of the members 251, 252 may be further from or closer to the first magnet unit 230.

Although two ferromagnetic members 251 and 252 are shown in FIGS. 11 through 14, the present embodiment is not limited thereto. That is, the sliding structure 200 may include fewer or additional ferromagnetic members 251 and 252 as desired. For example, a single ferromagnetic member may be disposed on a side of the first magnet unit 230 (e.g., proximate to the initial or final position of second slider member 220), or three or more ferromagnetic members may be disposed on one or both sides of the first magnet unit 230. Indeed, it should be appreciated that the at least one ferromagnetic member may have various configurations.

As shown in FIG. 14, the ferromagnetic members 251 and 252 have the same length $L_5$, which may be shorter than the length $L_3$ of the first magnet unit 230.

While the length $L_5$ of the ferromagnetic members 251 and 252 is illustrated in FIGS. 11 through 14 as being generally shorter than the length $L_3$ of the first magnet unit 230, the present embodiment is not limited thereto. That is, the length $L_5$ of the ferromagnetic members 251 and 252 may be longer than or equal to the length $L_3$ of the first magnet unit 230.

In some instances, the ferromagnetic members 251 and 252 help to positively hold the second sliding member 220 in one or more of the final and initial positions. Furthermore, since the second magnet units 241 and 242 may be attracted to the ferromagnetic members 251 and 252 (relative to the configuration of the members 251, 252 and an orientation of the second magnet units 241, 242), a sliding operation can be facilitated.

The second magnet units 241 and 242 of FIGS. 11 through 14 may have a substantially similar structure as the second magnet units 141 and 142 of FIGS. 2 through 10. That is, the second magnet units 241 and 242 may be identical to the second magnet units 141 and 142 in shape and the direction and order of magnetic poles.

Although the length $L_4$ of the second magnet units 241 and 242 may be the same as the length $L_3$ of the first magnet unit 230 as shown in FIG. 14, the present embodiment is not limited thereto. That is, the length $L_4$ of the second magnet units 241 and 242 may be longer than or shorter than the length $L_3$ of the first magnet unit 230.

As shown in FIGS. 12-14, magnetic shields 234 may be configured on top and bottom surfaces of the first magnet unit 230. Furthermore, magnetic shields 243a and 243b may be respectively configured on a bottom surface of the second magnet unit 241 and a top surface of the second magnet unit 242.

The magnetic shields 234, and the magnetic shields 243a and 243b are formed of a ferromagnetic substance to shield magnetic lines of force generated from the first magnet unit 230 and the second magnet units 241 and 242. The ferromagnetic substance may be an AD-MU alloy.

When the sliding structure 200 configured as described above is used in a mobile electronic device (e.g., such as a mobile phone, a camera, or a portable multimedia player (PMP)), the sliding operation is performed in such a manner that one of the first slider member 210 and the second slider member 220 may be embedded in a main body (e.g., in which electrical components, such as batteries, or main chipsets of the electronic device are integrated), whereas the other one of the first slider member 210 and the second slider member 220 may be embedded in a sub body of the device (e.g., having a relatively simple structure).

One of the first slider member 210 and the second slider member 220 may be formed by directly processing the main body, and the other of the first slider member 210 and the second slider member 220 may be formed by directly processing the sub body. In this case, the occupied area can be reduced, and thus the sliding type mobile electronic device can be made thin.

Since the operation of the sliding structure 200 of FIGS. 11 through 14 is substantially similar to the operation the sliding structure 100 of FIGS. 2 through 10, descriptions thereof have not been repeated.

However, since the sliding structure 200 of FIGS. 11 through 14 includes the ferromagnetic members 251 and 252, the second slider member 220 can be more stably disposed (i.e., positively held) at and easily moved to an initial position and a final position. That is, with the ferromagnetic members 251 and 252 being disposed at opposite ends of the length of the first slider member 210, the second magnet units 241 and 242 become attracted to the initial and final positions.

Also, the sliding operation of the second slider member 220 can be more easily performed due to the attracting force between the second magnet units 241 and 242 and the ferromagnetic members 251 and 252. For example, when the second slider member 220 is slid up from the intermediate position to the final position, not only the repelling force acts between the second magnet units 241 and 242 and the first magnet unit 230 but also an attracting force acts between the second magnet units 241 and 242 and the ferromagnetic members 251 and 252. Accordingly, the second slider member 220 can be slid up with little or no difficulty.

Furthermore, since the siding structure 200 includes the ferromagnetic members 251 and 252, the sliding operation can be more easily performed due to the attracting force between the second magnet units 241 and 242 and the ferromagnetic members 251 and 252.

As described above, the sliding structure according to the present invention can make a mobile electronic device thin, and can smoothly slide with less friction during the sliding operation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic levitation sliding structure comprising:
a first slider member having a first end and a second end, a first length being defined by a distance between the first and second ends, the first slider member including a guide portion that extends at least a portion of the first length;
a first magnet coupled with the guide portion, the first magnet being spaced away from both of the first end and the second end;
a second slider member having a second length, the second slider member including a receiving portion that extends at least a portion of the second length and has a complementary shape to the guide portion for slidably mating with the guide portion; and
a pair of second magnets coupled with the receiving portion in a spaced-apart configuration, wherein the first magnet is configured between the pair of second magnets for repelling the second slider member.

2. The sliding structure of claim 1 wherein the first magnet is configured in a central portion of the guide portion.

3. The sliding structure of claim 1 further comprising at least one ferromagnetic member coupled with the guide portion proximate to at least one of the first end and the second end.

4. The sliding structure of claim 3 wherein the at least one ferromagnetic member is substantially enclosed in the guide portion.

5. The sliding structure of claim 3 wherein the at least one ferromagnetic member comprises:
a first ferromagnetic member configured proximate to one of the first end and the second end; and
a second ferromagnetic member configured proximate to the other one of the first end and the second end.

6. The sliding structure of claim 5 wherein the first ferromagnetic member is spaced away from a first end of the first magnet by a first predetermined distance, and wherein the second ferromagnetic member is spaced away from a second end of the first magnet by a second predetermined distance.

7. The sliding structure of claim 6 wherein the first predetermined distance is substantially similar to the second predetermined distance.

8. The sliding structure of claim 1 further comprising at least one magnetic shield interposed between the first magnet and a second magnet of the pair of second magnets.

9. A magnetic levitation sliding structure for a portable electronic device including a first movable portion and a second movable portion, the magnetic levitation sliding structure comprising:
a first slider member connected to one of the first and second movable portions, the first slider member including a first end and a second end, wherein a distance between the first and second ends defines a first length, a guide portion that extends at least a portion of the first length, and a first magnet configured in the guide portion, the first magnet being spaced away from both of the first end and the second end; and
a second slider member connected to the other one of first and second movable second portions, the second slider member including a second length, a receiving portion that extends at least a portion of the second length and which has a complementary shape to the guide portion for slidably mating with the guide portion, and a spaced-apart pair of second magnets configured in the receiving portion,
wherein the first magnet is configured between the spaced-apart pair of second magnets for facilitating relative movement of the first and second movable portions and repelling the second slider member.

10. The sliding structure of claim 9 wherein the first magnet is substantially enclosed in the guide portion and the pair of second magnets is substantially enclosed in the receiving portion.

11. The sliding structure of claim 9 further comprising at least one ferromagnetic member coupled with the guide portion proximate to at least one of the first end and the second end.

12. The sliding structure of claim 11 wherein the at least one ferromagnetic member is substantially enclosed in the guide portion.

13. The sliding structure of claim 11 wherein the at least one ferromagnetic member comprises:
a first ferromagnetic member configured proximate to one of the first end and the second end; and
a second ferromagnetic member configured proximate to the other one of the first end and the second end.

14. The sliding structure of claim 13 wherein the first ferromagnetic member is spaced away from a first end of the first magnet by a first predetermined distance, and wherein the second ferromagnetic member is spaced away from a second end of the first magnet by a second predetermined distance.

15. The sliding structure of claim 14 wherein the first predetermined distance is substantially similar to the second predetermined distance.

16. The sliding structure of claim 9 further comprising at least one magnetic shield interposed between the first magnet and a second magnet of the pair of second magnets.

17. A portable electronic device comprising:
a first slidably movable portion that slides in a first direction including a first slider member, the first slider member including a first length defined by a distance between a first end and a second end, a guide portion that extends at least a portion of the first length, and a first magnet configured in the guide portion, the first magnet being spaced away from both of the first end and the second end; and
a second slidably movable portion including a second slider member, the second slider member including a second length, a receiving portion that extends at least a portion of the second length and which has a complementary shape to the guide portion for slidably mating with the guide portion, and a spaced-apart pair of second magnets configured in the receiving portion, the second magnets having magnetic poles arranged in a second direction substantially perpendicular to the first direction, wherein the first magnet is configured between the spaced-apart pair of second magnets for facilitating relative sliding movement of the first and second slidably movable portions.

18. The portable electronic device of claim 16 further comprising at least one ferromagnetic member coupled with the guide portion proximate to at least one of the first end and the second end.

19. The portable electronic device of claim 18 wherein the at least one ferromagnetic member comprises:
   a first ferromagnetic member configured proximate to one of the first end and the second end; and
   a second ferromagnetic member configured proximate to the other one of the first end and the second end.

20. The portable electronic device of claim 19 wherein the first ferromagnetic member is spaced away from a first end of the first magnet by a first predetermined distance, and wherein the second ferromagnetic member is spaced away from a second end of the first magnet by a second predetermined distance.

* * * * *